(12) United States Patent
Kodric

(10) Patent No.: US 6,250,906 B1
(45) Date of Patent: Jun. 26, 2001

(54) STACK MOLD

(76) Inventor: Joseph Kodric, 77 Frith Road, Downsview, Ontario (CA), M3N 1G5

( * ) Notice: Subject to any disclaimer, the term of this patent is extended or adjusted under 35 U.S.C. 154(b) by 0 days.

(21) Appl. No.: 09/374,596

(22) Filed: Aug. 16, 1999

(51) Int. Cl.[7] .................................................. B29C 45/64
(52) U.S. Cl. ...................... 425/190; 425/451.3; 425/588; 425/589
(58) Field of Search .............................. 425/190, 192 R, 425/451.3, 588, 589

(56) References Cited

U.S. PATENT DOCUMENTS

| | | | | |
|---|---|---|---|---|
| 4,154,566 | * | 5/1979 | Ward | 425/451.3 |
| 4,260,358 | * | 4/1981 | Mehnert | 425/451.3 |
| 5,395,232 | * | 3/1995 | Hori | 425/451.3 |
| 5,908,597 | * | 6/1999 | Boudreau et al. | 425/588 |

* cited by examiner

*Primary Examiner*—James P. Mackey
(74) *Attorney, Agent, or Firm*—Sim & McBurney

(57) ABSTRACT

A universal mountable and demountable rack-and-pinion structure for a stack mold includes mounting plates affixed to the mold parts and rack-and-pinion mounting elements which are mountable to and demountable from the mounting plates. This arrangement permits the rack and pinion elements first to be mounted in an approximately correct position for the appropriate proportionation of movement within a molding machine. The device includes an adjustment feature which permits the relative distances between the mold parts to be finely adjusted to ensure correct proportionation of movement. The rack-and-pinion structure is interchangeable for various stack molds.

3 Claims, 6 Drawing Sheets

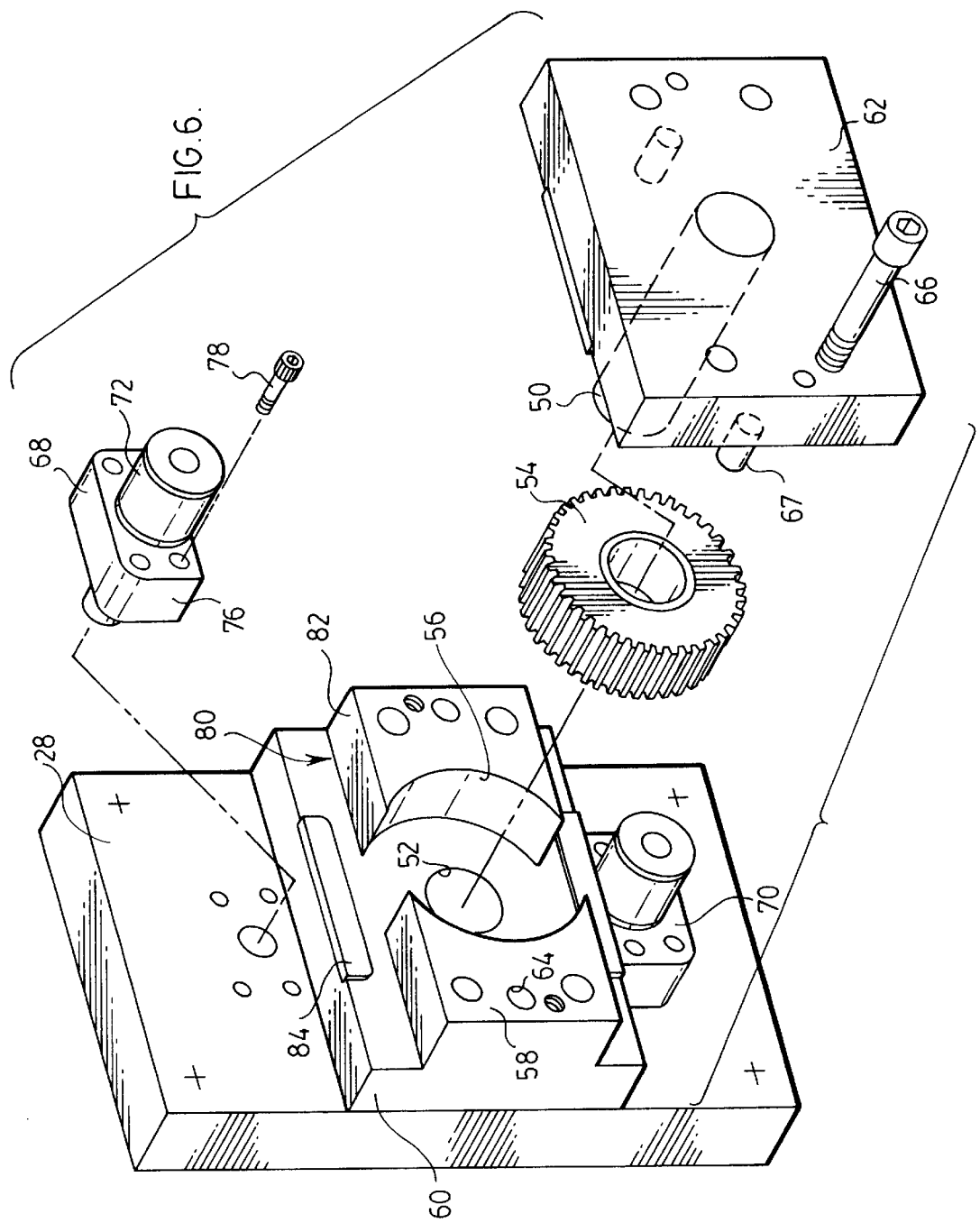

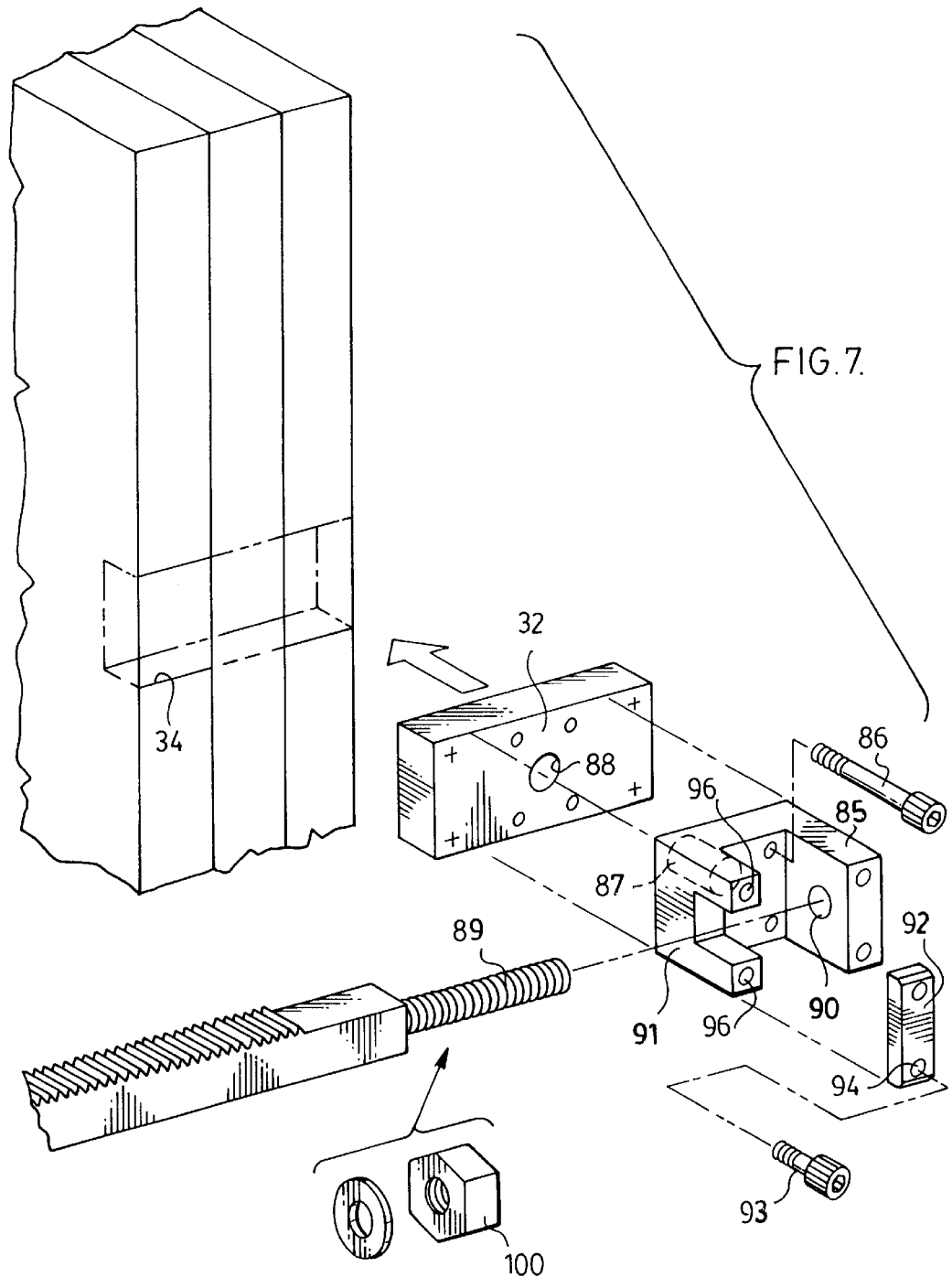

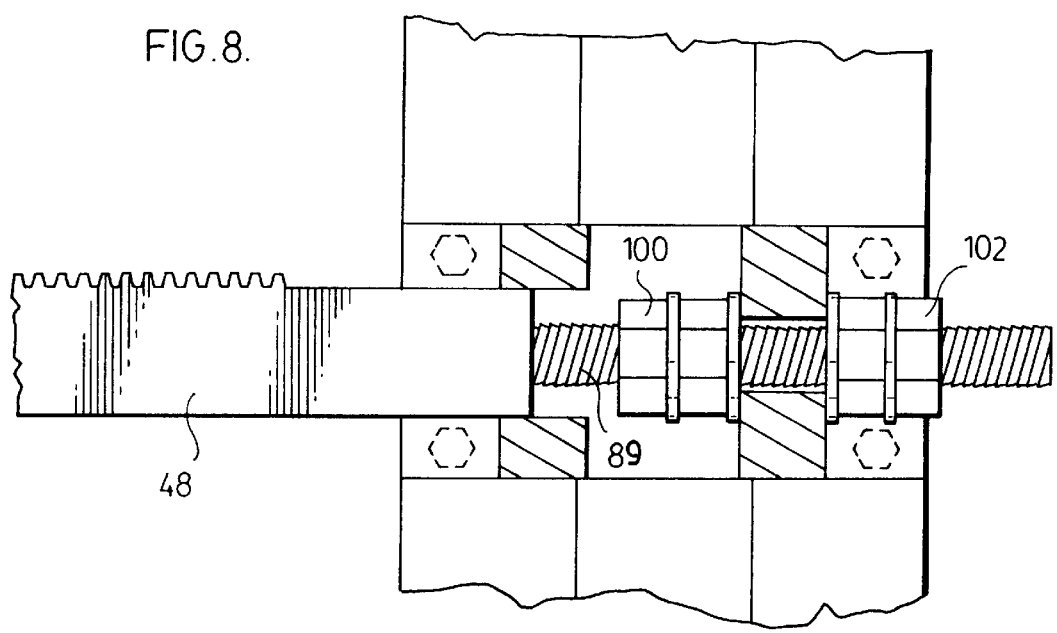
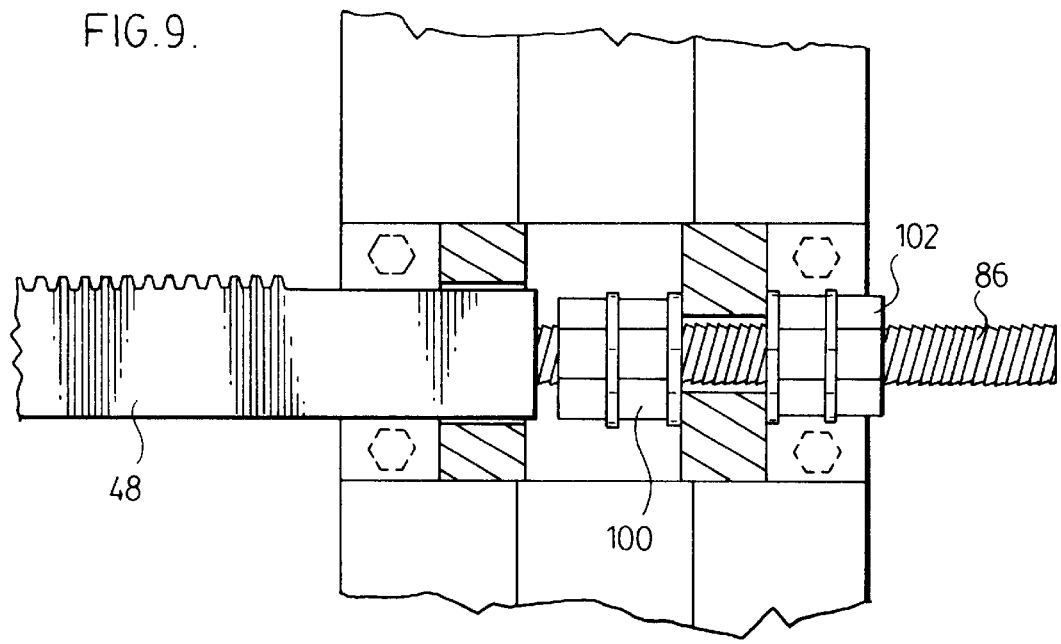

STACK MOLD

FIELD OF THE INVENTION

The present invention relates to injection molding machines and, in particular, to stack molds employed therein.

BACKGROUND TO THE INVENTION

In the molding of plastic parts by injection molding, mold parts are brought together to define a mold cavity, polymeric material is injected into the mold cavity and, after allowing time for the polymer to solidify, the mold parts are drawn apart and the molded part removed.

The moveable elements or plattens of the molding machine are arranged to move in a horizontal direction and slide on stationary bars to transport the moveable mold parts into and out of mating relationship with a stationary mold part.

Such molds may be single face, with a single moveable mold part and a stationary mold part or may be a stack mold where two or more moveable mold parts move towards and away from a stationary mold part.

In the latter molding machines, a rack-and-pinion structure often is used to achieve synthronized self-positioning of the moveable mold parts. In such devices, rack elements are attached to the stationary mold part and the outer moveable mold part, while a pinion is mounted to the inner moveable mold part. Depending on the size of the stack mold, one or more such rack-and-pinion structures may be provided on each side of the stack mold.

In general, the rack-and-pinion structure is custom-made for a specific stack mold and it is necessary to precisely position the device on the mold parts of the stack mold to ensure correct mold operation in the molding machine. When access to the mold parts is required for removal from the molding machine and replacement by another stack mold, the rack-and-pinion structure often needs to be first removed and then subsequently reassembled, a time consuming operation.

SUMMARY OF INVENTION

The present invention represents an improvement on the prior art, permitting a degree of flexibility and ease of operation which has not previously been achieved. The present invention provides a universal rack-and-pinion structure for use with stack molds, which is readily and rapidly demounted and mounted and permits rapid adjustment for proper proportioning of movement of the moveable mold parts in a stack mold in a molding machine.

Accordingly, in one aspect of the present invention, there is provided in a stack mold of the type wherein at least a pair of moveable molding parts move into and away from mold-cavity forming relationship with each other and a stationary mold part, the improvement comprising rack-and-pinion structure mounting plates affixed one to each of the moveable mold parts and stationary mold part; a pinion housing structure containing a pinion mountable to and demountable from the mounting plate affixed to the inner moveable mold part; a rack mounting element mountable to and demountable from the mounting plate affixed to the outer moveable mold part and to the stationary mold part; a first rack element extending between one said rack mounting elements and into gear-meshing relationship with the pinion in the pinion housing when said molding parts are out of mold cavity forming relationship; a second rack element extending between the other of said rack mounting element and into gear-meshing relationship with the pinion in the pinion housing when said molding parts are out of mold cavity forming relationship; and adjustment means associated with each of the rack mounting elements and the respective end of the rack element to adjust the distance between the moveable mold part from each other and from the stationary mold part to ensure that a mold cavity is formed between the outer and inner moveable mold parts at the same time as a mold cavity is formed between the inner moveable mold part and the stationary mold parts.

BRIEF DESCRIPTION OF DRAWINGS

FIG. 6 is a perspective partly broken-away view of the rack-and-pinion device of FIG. 4;

FIG. 7 is a perspective partly broken-away view of a mounting assembly for mounting the rack-and-pinion device of FIG. 3 to the moveable mold parts; and FIGS. 8 and 9 are elevational views illustrating the mounting of the rack-and-pinion device to the moveable mold parts.

DESCRIPTION OF PREFERRED EMBODIMENT

Figure 1:
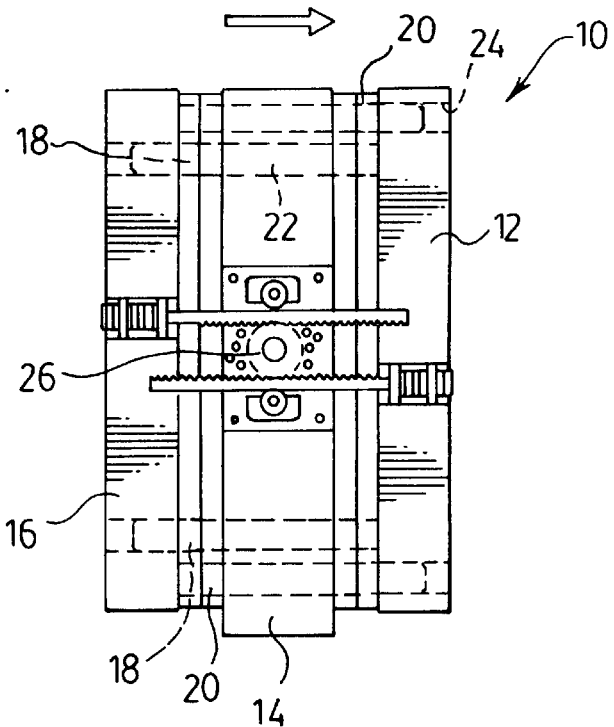
FIG. 1 is a elevational view of a stack mold of otherwise conventional structure but modified in accordance with one embodiment of the invention, in a closed position.
Figure 2:
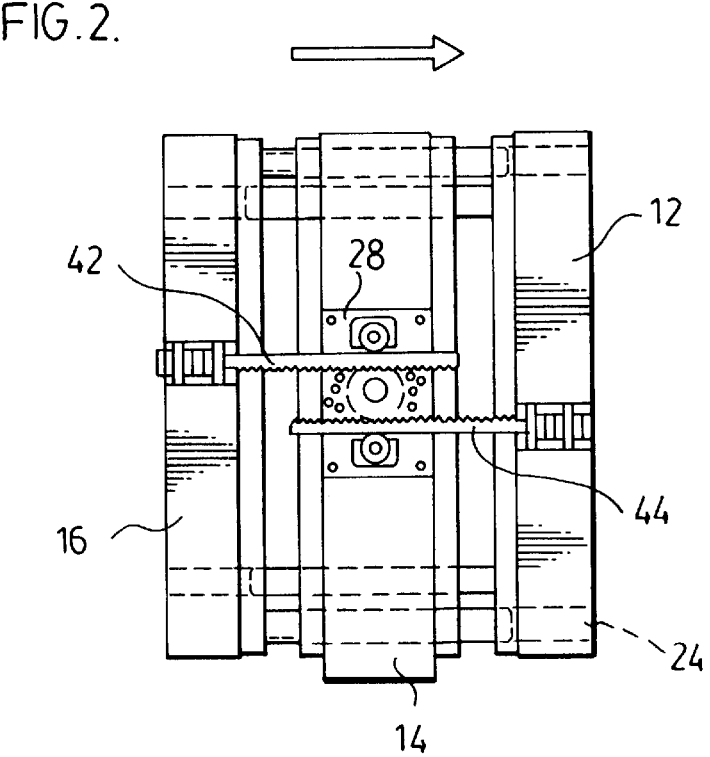
FIG. 2 is a elevational view of the stack mold of FIG. 1, in an open position.
Figure 3:
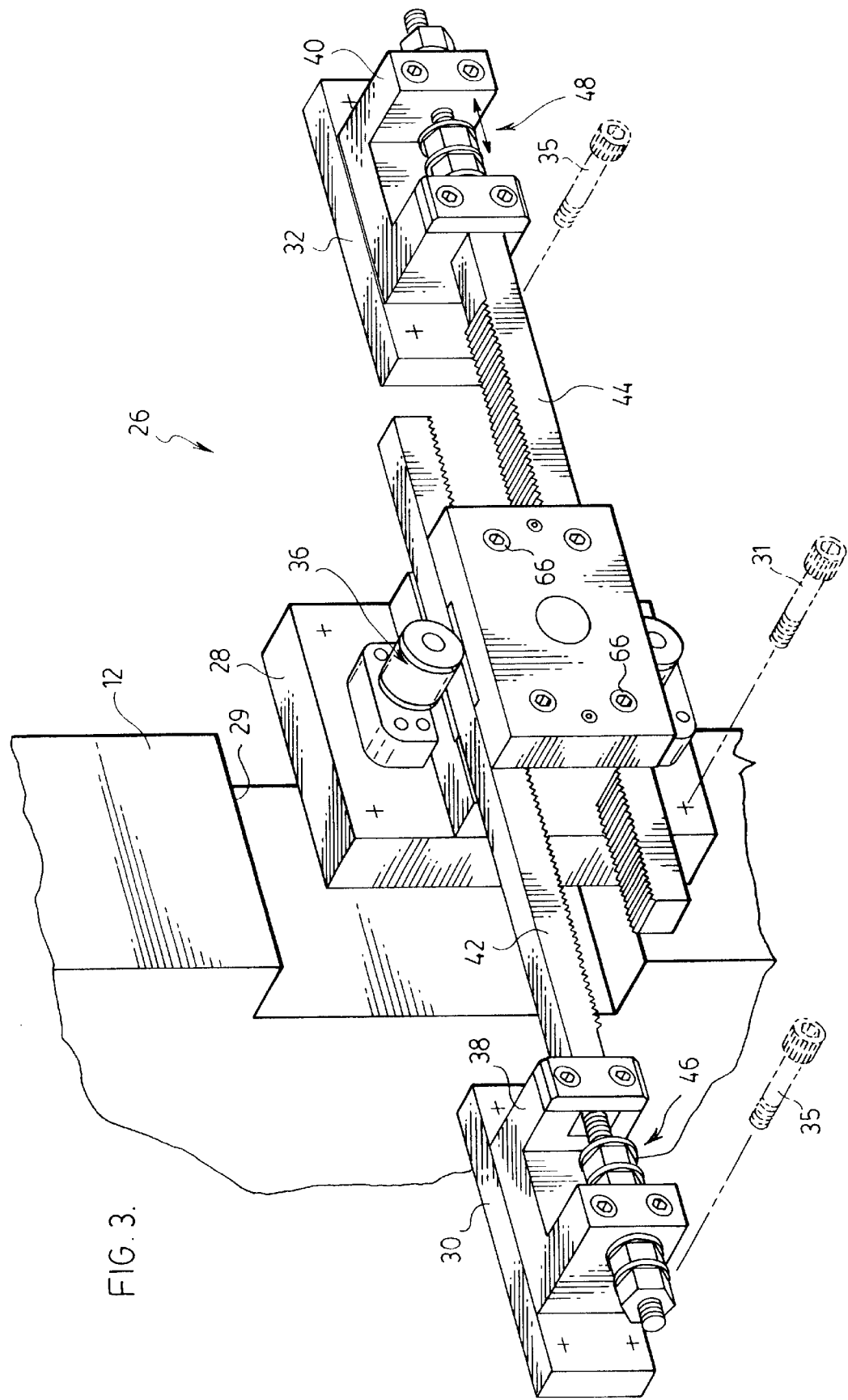
FIG. 3 is a close up, perspective view of rack-and-pinion device provided in accordance with one embodiment of the invention and utilized with the stack mold of FIGS. 1 and 2.
Figure 4:
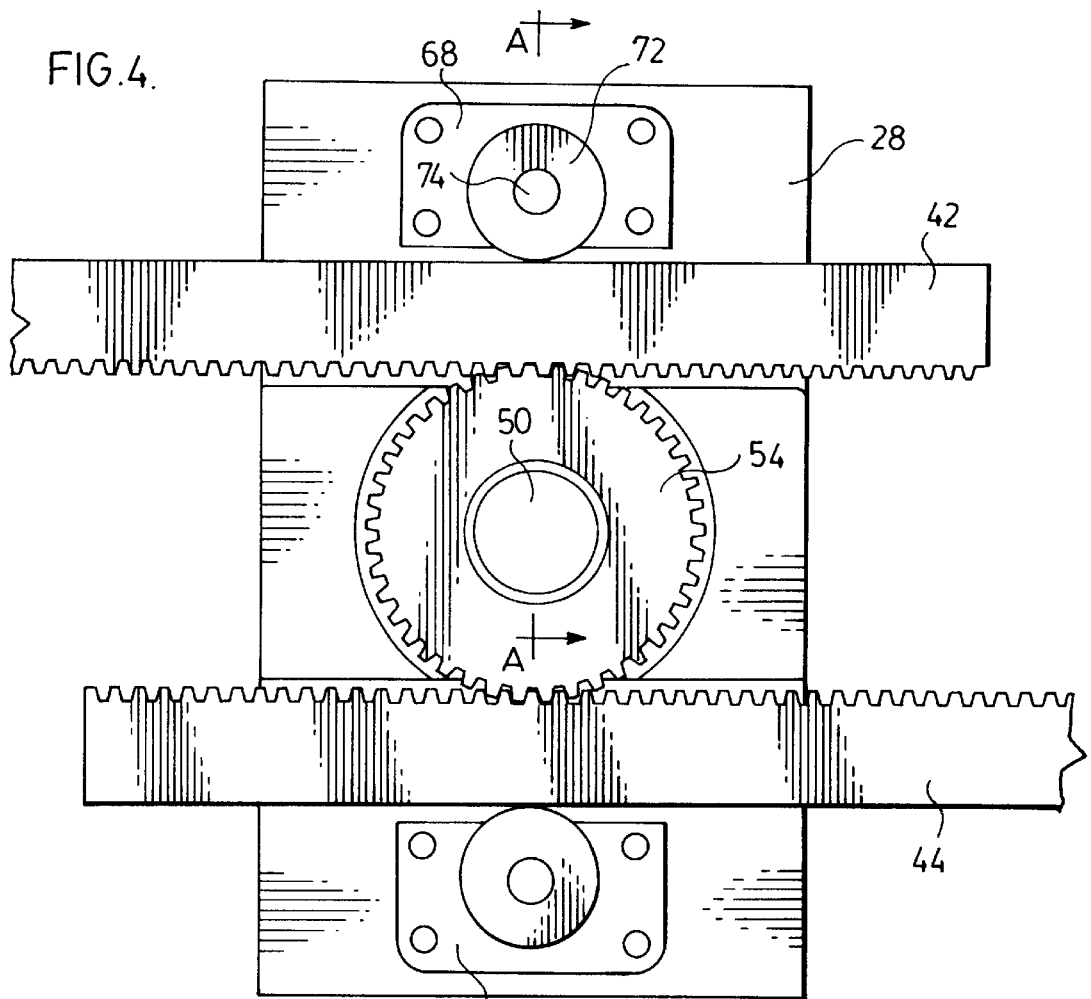
FIG. 4 is a close up front elevational view of a detail of the rack-and-pinion device of FIG. 3.
Figure 5:
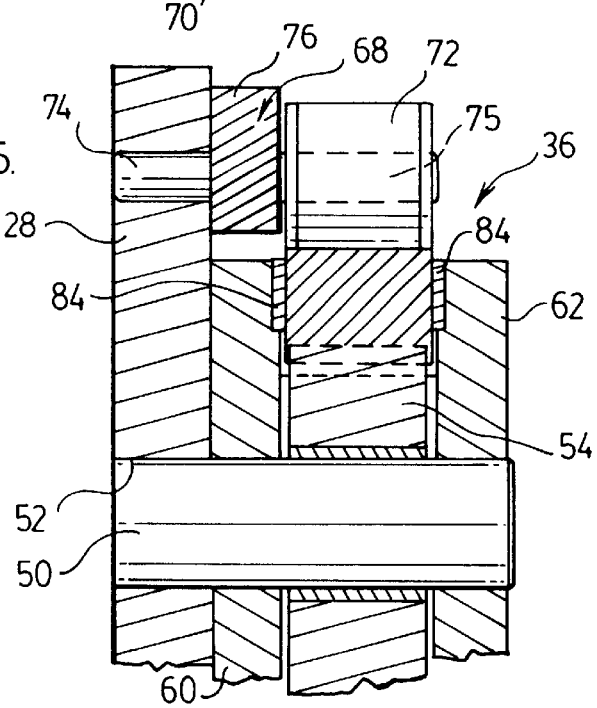
FIG. 5 is a sectional view of the rack-and-pinion device taken on line A—A of FIG. 4.

Referring first to FIGS. 1 and 2, a stack mold 10 comprises an end stationary mold part 12 and a pair of moveable mold parts 14, 16 moveable into and out of mold-cavity forming relationships between the inner moveable mold part 14 and the stationary mold part 12 and between the outer moveable mold part 16 and the inner moveable mold part 14.

The moveable mold parts 14, 16 are arranged in sliding relationship with the stationary mold part 12 by guide pins 18, 20. The guide pins 18, 20 protrude respectively from the stationary mold part 12 and outer moveable mold part 16, through openings 22 in the central moveable mold part 14 and into recesses 24 formed in the stationary mold part 12 and the moveable mold part 14 when in the closed position (FIG. 1).

In order for the stack mold to function correctly within a molding machine, it is necessary for the mold cavities to be formed between the stationary mold part 12 and the inner moveable mold part 14 and the mold cavity to be formed between inner (14) and outer (16) moveable mold parts to be formed at the same moment and hence the movements of the moveable mold parts 14 and 16 are required to be coordinated to achieve this effect.

As mentioned previously, one known manner of achieving the required coordinated movement is to employ a rack-and-pinion device. Accordingly to one embodiment of the invention, a novel rack-and-pinion device 26 comprises a set of mounting plate elements 28, 30, 32. The mounting plate 28 enables the pinion element to be mounted to the inner moveable mold part 14, while the mounting plates 30 and 32 enable the rack elements to be mounted to the mounting to the stationary mold part 12 and the moveable mold part 16.

The mounting plate element 28 is intended to be permanently mounted in a suitable recess 29 in the face of the inner moveable mold part 14 using mounting pins 31 while the mounting plate elements 30 and 32 are intended to be permanently mounted in the suitable recesses 34 (FIG. 7) in the face of the outer moveable mold part 16 and the stationary mold part 12 respectively using mounting pins 33 and 35.

A pinion housing 36 and rack mounting elements 38, 40 are structured, as detailed below, to permit rapid mounting and demounting of the rack-and-pinion structure from the respective mounting plates 28, 30 and 32, thereby rapidly mounting and demounting the rack-and-pinion structure from the stack mold.

In addition, by selecting a length of rack element 42, 44, a rough adjustment of a relative positioning of the mold parts is achieved and a respective adjustment element 46, 48 associated with the respective rack mounting elements 38, 40 permits rapid fine adjustment of the relative position of the mold parts for precise operation.

The mounting plate element 28 has a shaft 50 mounted in an opening 52 in the mounting plate and protruding therefrom and over which is mounted the pinion housing 36. A gear wheel 54 is mounted on the shaft 50 for rotation in a recess 56 formed in a guide plate 58 sandwiched between an inner plate 60 and an outer face plate 62 into which the shaft 50 also extends. Locating pins 63 on the outer plate 62 and corresponding recesses 64 in the guide plate 58 ensure proper alignment of the elements. The overall pinion housing assembly 36 is mounted to the mounting plate 28 by threaded bolts 66 extending through openings in the elements 58, 60, 62 and into screw-threaded engagement with threaded recesses in the mounting plate 28.

Upper and lower rack guide elements 68, 70 comprise a roller 72 rotatably mounted on a shaft 75, which extends from a mounting element 76, which has a further shaft 74 extending into the mounting plate 28. The rack guide elements 68, 70 are mounted to the mounting plate 28 by screw-threaded bolts 78 extending through the element 76 and into screw-threaded engagement with threaded recesses in the mounting plate 28.

A pair of elongate gear-toothed rack elements 42 and 44 extend in gear meshing relationship with the gear wheel 54 and in engagement with the roller elements 72, in a channel 80 formed by the opposed faces of the elements 60 and 62 and a shoulder 82 on element 58. A pair of centering bars 84 is provided on opposite sides of the channel 80 to ensure proper positioning of the rack elements 42 and 44.

It will be seen that the whole pinion and rack support assembly 36 is readily and rapidly mounted to and demounted from the mounting plate 28 by removing and replacing the mounting bolts 78.

The opposite ends of the rack elements 42 and 44 from the support assembly 36 are mounted respectively to ones of the rack mounting elements 38, 40. The rack mounting elements 38, 40 each comprises a yoke element 85 which can be mounted to the mounting plate 32 by suitable screw-threaded bolts 86 extending into screw-threaded recesses in the mounting plate 32 with the aid of locating pin 87 received in recess 88 in plate 32. A screw-threaded element 89 extends from the end of the rack element 42 through an opening 90 in the yoke element 85 while the square cross-sectioned end of rack element 42 is received in a C-shaped element 91 of the yoke 85, which is closed by plate 92 to define a rectangular cavity in which the rack element 42 is received in sliding fit relationship. A pair of screw-threaded bolts 93 extend through openings 94 in the plate 92 into screw-threaded recesses 96 in the C-shaped element 91.

A first pair of locking nuts 100 is mounted on the screw-threaded element 89 between the arms of the yoke 85 while a second pair of locking nuts 102 is mounted to the screw threaded element 89 at the free end of the element 89 extending through the opening 90.

In general, the rack elements 42, 44 have a length which enables the rack and pinion structure to be mounted to a number of different stack molds, thereby providing a universal structure applicable to a number of stack molds to be employed in a particular molding machine. Fine adjustment of the relative positions of the mold parts 12, 14, 16 to provide for accurate proportionation during molding by the stack mold within the molding machine may be achieved by manipulation of the pairs of locking nuts 100, 102, such as is seen in FIGS. 8 and 9.

While the illustrated embodiment of FIGS. 1 and 2 shows a single rack-and-pinion device 26 mounted to the mold parts, it is desirable to provide at least two such devices on each side of the mold, one adjacent the upper position of the mold parts and the other adjacent the lower portion of the mold parts. Such an arrangement avoids the stress on a single element.

In addition, while the illustrated embodiment of FIGS. 1 and 2 shows a stack mold having two moveable mold parts, it is possible to have three, four or more moveable mold parts. In such case, further rack-and-pinion devices are used to achieve the required proportionality of mold part movement.

In operation, as the moveable mold parts 14, 16 move towards and away from the stationary mold part 12 in molding operations, the elements 42 and 44 move relative to the rotatable ring gear 54 located in its housing structure 36.

The recess 80 in which the rack members 42, 44 move guided by the rollers 72 and the mounting of the free ends of the rack members 42, 44 to the mounting plates 30, 32 ensures proper operation of the stack mold within a molding machine.

As seen from the above discussion, by providing mounting elements which are permanently affixed to stack mold parts and by providing elements which are rapidly mounted or demounted from the mounting elements, the rack-and-pinion structure illustrated herein is very flexible and universally applicable to all stack molds.

In addition, by providing for fine adjustment of the position of the mold parts relative to each other, accurate molding operations are possible. Further, the device of the invention is useful with different stack molds, in view of the flexibility of operation.

SUMMARY OF DISCLOSURE

In summary of this disclosure, the present invention provides a universal rack-and-pinion structure for use with stack molds which is readily mounted thereto and demounted therefrom. Modifications are possible within the scope of this invention.

What I claim is:

1. In a stack mold wherein at least a pair of movable mold parts comprising an inner movable mold part and an outer movable mold part move into and away from mold-cavity forming relationship with each other and a stationary mold part, said inner movable mold part being located between said outer movable mold part and said stationary mold part, the improvement comprising:

rack-and-pinion structure mounting plates affixed one to each of the moveable mold parts and stationary mold part, a pinion housing structure containing a pinion mountable to and demountable from the mounting plate affixed to the inner moveable mold part, rack mounting elements mountable to and demountable from the mounting plate affixed to the outer moveable mold part and to the stationary mold part respectively, a first rack element extending from one of said rack mounting elements and into gear-meshing relationship with the pinion in the pinion housing, a second rack element extending from the other of said rack mounting elements and into gear-meshing relationship with the pinion in the pinion housing, and adjustment means associated with each of the rack mounting elements and a respective associated end of the rack element to adjust the distance between the moveable mold parts from each other and from the stationary mold part to ensure that a closed mold cavity is formed between the outer and inner moveable mold parts at the same time as a closed mold cavity is formed between the inner moveable mold part and the stationary mold part.

2. The stack mold of claim 1 wherein said pinion housing comprises:

a pinion-mounting shaft extending into the mounting plate on the inner moveable mold part, pinion recess-forming elements releasably connectable to each other and to the mounting plate and comprising inner and outer plate elements and sandwiching pinion housing elements, upper and lower rack guide means defined by upper and lower rectangularly cross-sectioned elongate recesses and adjacent roller elements, said respective rack elements being held in gear-meshing relationship with the pinion by the recess on three sides and the roller element on the fourth side.

3. The stack mold of claim 1 wherein said adjustment means comprises:

a yoke rack mounting element having a first arm through which is received a screw-threaded end of said rack element and a second arm defining a rectangular recess in which the rack element is received in sliding-fit relationship, a first pair of locking units mounted on said screw-threaded end between said arms of said of yoke rack mounting element, and a second pair of locking units mounted on said screw-threaded end projecting through the first arm.

* * * * *